Nov. 26, 1957     D. LABINO     2,814,657
METHOD AND APPARATUS FOR HEATING GLASS
Filed Nov. 23, 1953
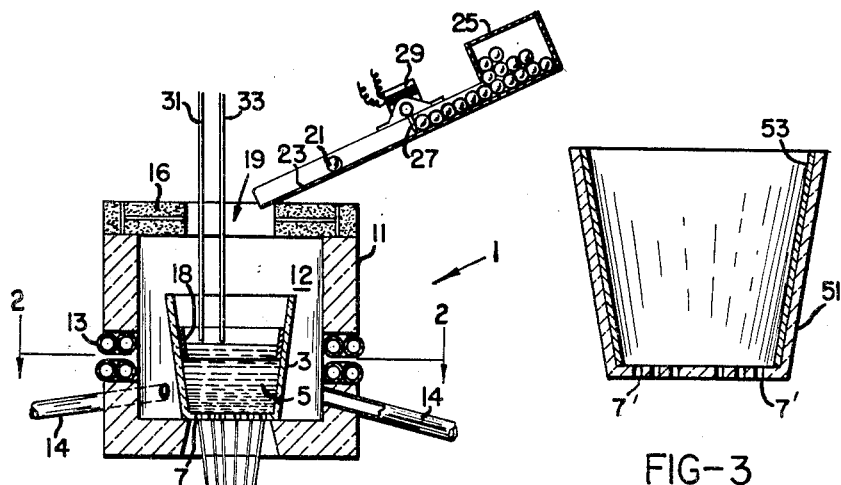
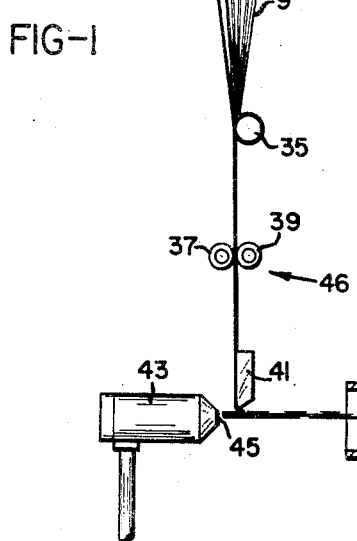
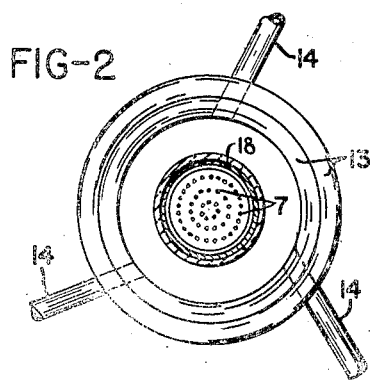
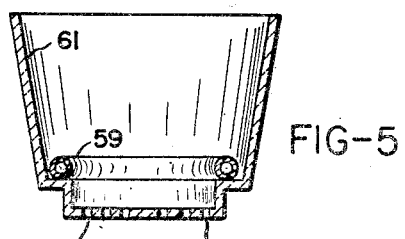
INVENTOR.
DOMINICK LABINO
BY Toulmin & Toulmins
ATTORNEYS

United States Patent Office 2,814,657
Patented Nov. 26, 1957

2,814,657

METHOD AND APPARATUS FOR HEATING GLASS

Dominick Labino, Toledo, Ohio, assignor, by mesne assignments, to L. O. F. Glass Fibers Company, Toledo, Ohio, a corporation of Ohio Application November 23, 1953, Serial No. 393,797

6 Claims. (Cl. 13—2)

This invention relates to the uniform heating and melting of glass, and more particularly to apparatus and a method for the production of fine fibers or filaments of glass.

This application is related to my co-pending application, Serial No. 387,260, filed October 20, 1953, and assigned to the same assignee as the present invention.

In that co-pending application the subject matter is directed to the production of fine, uniform diameter glass fibers and filaments, and particularly to equipment and a method therefor, which equipment specifically includes a crucible of a fire clay material such as Sillimanite for the retention of molten glass; such a crucible is resistant to thermal shock and the action of the molten glass including the lead glasses.

My present invention contemplates as a principal object an improved structure for the heating and melting of glass and involves the provision within the fire clay crucible and the molten glass body itself of a metallic, molten-glass resistant electrically conductive member; this member or electrically conductive body is supplied with energy by a surrounding induction heating coil. The metallic conductive body is effective to insure that within a relatively small diameter pot of molten glass, for example 5 inches in diameter, a uniform temperature in the glass body, within about 5 degrees variation, will be attained.

It is an important object of the invention to provide specific control means for the uniform melting of molten glass contained in a crucible of a refractory such as fire-clay and which crucible itself in the manufacturing process is gas-heated.

It is a particular object of the invention to provide a novel method for the heating and melting of glass to a substantially uniform temperature condition such that the molten glass is extremely useful in the formation of fine filaments of closely controlled diameter.

These and other allied objectives of the invention are attained by providing within a crucible of a fire-clay material a body of electrically conductive, temperature and chemically resistant metal. The metal body in the practice of the invention surrounds apertures in the melting crucible through which the molten glass is exuded to be formed into filaments, and the body of metal is preferably positioned at approximately a central portion of the field of the induction heating coil which coil itself is at the level of the molten glass. The field of the coil is thus effective to cause a heating of the metal body and the heat capacity of the metal body is available to heat the glass and/or stabilize the temperature thereof and accordingly the viscosity of the glass is extremely uniform as the glass passes through the apertures to be formed into filaments and fibers.

Filament forming materials which are normally electrically conductive or which become electrically conductive under the influence of temperature are of utility in the practice of the invention. Included within these materials are the various glasses which increase in electrical conductivity as their temperature rises probably due to the increased mobility of ions within the glass melt. This conductivity increases, generally speaking, with an increase of the frequency applied to the induction heating coil and the resultant effect obtained is a close control of the heating of the glass or other conductive filament forming material when energy is applied to the coil.

Heating the glass directly rather than only from the bounding walls of the crucible containing the glass increases the uniformity of the temperature of the melt and consequently the uniformity of viscosity which assists materially in the control of the formation of the glass into filaments.

The preferred material for the metallic body of electrically conductive, temperature and chemically resistant metal is molybdenum. This metal has good chemical resistance and a very high melting point (2620° C.) which is considerably greater than that of glass, for example; molybdenum has an electrical resistance which is only about three times that of copper and a temperature co-efficient of resistance which is only slightly greater than copper; also the thermo conductivity of molybdenum is only about one-third that of copper. Accordingly the molten material will not attack this metal and the favorable electrical and thermo properties will promote conductivity in the glass itself and the rapid attainment of uniform temperature conditions between the glass and the metal body is assured.

Other temperature chemically resistant metals may be employed, for instance platinum and tungsten; however the latter are relatively expensive and offer no particular advantages with respect to molybdenum. The metal body itself may be in any suitable shape but it is most suitable to apply the metal as a thin film to the inner side of the fire-clay crucible preferably at the glass melting level of the crucible; however a solid ring or if preferred a hollow ring of the metal may be employed and these may also be positioned at the glass melting level. The metallic film is preferred as it is of low weight, not bulky, affords maximum protection to the fire-clay wall from products of any foaming which sometimes occurs, as well as supplying the heat in a distributed manner to the glass.

In the preferred practice of the invention the fire-clay crucible is principally heated by the combustion of suitable fuel gases and the heat derived from the metallic body within the crucible is useful as a stabilizing medium for temperature control; the use of the metal as the primary or sole source of heat involves a relatively large mass of metal and consequently the equipment cost then approaches that of an all-metal crucible, which materially increases production costs.

The invention will be more fully understood by reference to the following detailed description and accompanying drawings wherein:

Figure 1 is a schematic view partially in section of apparatus illustrating one embodiment of the invention;

Figure 2 is a sectional view taken on line 2—2 of Figure 1 with no glass in the crucible; and Figures 3, 4 and 5 illustrate further embodiments of the crucible structure of invention.

Referring to the drawings the reference character 1 indicates the fiber forming apparatus embodying a substantially conical melting crucible 3 adapted to retain a supply of molten glass 5; the bottom of crucible 3 is provided with a plurality of restrictive discharge orifices 7 from which molten glass may flow to be attenuated into fibers or primary filaments 9.

The crucible 3 is thin-walled and is formed of a material capable of withstanding high temperature over long periods of subjection to the molten mass of glass and consists of Sillimanite ($Al_2O_3 \cdot SiO_2$), although other high temperature, molten-glass resistant fire-clays may be used.

Surrounding the crucible 3 and supporting the same, is a suitable heat resistant refractory body 11 which with the crucible define a peripheral inner spacing 12. A plurality of inlet ports 14 (Figure 2) for the passage of a combustible gas are communicable with spacing 12 and are so constructed and arranged that the entering gases contact the crucible 3 tangentially; the burned gases of combustion pass upwardly through loosely positioned fire bricks 16 atop the refractory body 11 and escape to the atmosphere.

Refractory body 11 supports the crucible at a passage in the base, the orifices 7 of the base thus being protected from undue cooling by the atmosphere; this is necessary for adequate filament drawing.

Refractory body 11 retains therein at about the glass melting level of crucible 3 induction heating coils 13 which have suitable insulation and may be of tubular copper in which case cooling water is passed therethrough during operation to prevent melting of the copper, or the coils may suitably be of platinum in which case cooling is not necessary and heat losses are thus minimized.

The coil 13 is adapted to be connected to the output side of a suitable high frequency generator or oscillator (not shown); where an oscillator is employed it preferably imposes a frequency of 1.5 megacycles or more across the coil to occasion heating of the crucible 3 and the glass therein. However a generator operating at a frequency of 10,000 cycles is suitable in the embodiment described herein.

Positioned within the body of molten glass 5 and supported on the inner wall of crucible 3 is a peripheral film of metal which extends from the glass melting level down the wall for a distance of about ½ inch. This film is itself heated by the field of the coil and the film in turn supplies heat to the molten glass in crucible 3; also the film protects the wall of the crucible against erosion by those chemicals which tend to come out of the hot glass and be retained floating thereon.

The conical crucible 3 usually has a diameter at the base of about 3 inches, at the top of about 5 inches, an overall height of about 5 inches and a liquid height from the base to film 18 of about 4 inches.

The metal film 18 of Figure 1 may suitably be adhered to the wall in foil form, may be plated thereon as by deposition from the gaseous state; or may be effected by spraying molten metal. The molybdenum film 18 may have a thickness of about 1/16 of an inch and may suitably cover substantially the whole of the inner side of the crucible but is preferably spaced from the discharge orifices 7; the film may suitably surround such orifices but any discontinuity in the passages must be carefully avoided. The film is most effective when positioned at the glass melting level and which level is the glass surface where raw glass is added to the crucible to replace that withdrawn through the orifices; this level varies slightly in height from the base in the course of production operations.

Raw or fresh glass is added preferably in the form of marbles through a central opening 19 of the body 11 and as shown in Figure 1 a marble 21 is moving down ramp 23 from hopper 25; a gate 27 the operation of which is controlled by a suitable solenoid indicated at 29 regulates the passage of the marbles to the crucible 3 wherein the marble melts at the liquid surface level. The specific means for controlling the flow of the glass marbles forms no part of this invention and accordingly is not described in detail herein; a most suitable circuit for such control is disclosed in my co-pending application Serial No. 387,260, filed October 20, 1953. However it is to be noted that electrodes 31, 33 when out of contact with the glass 5 are electrically insulated from each other and power may then be applied to the solenoid 29 from a suitable source to cause actuation of gate 27 and flow of glass to the crucible 3; when sufficient glass has been added to cause a contact between the glass and the two electrodes a circuit is completed thereby which may be made to de-energize the first circuit and the solenoid 29 to thereby halt the flow of marbles to crucible 3; thus the electrodes 31, 33 control the level of the glass in crucible 3 within narrow limits.

Positioned below the crucible 3 are a guide roll 35 and suitably driven drawing rolls 37, 39 for effecting rapid drawing of the molten glass, exuding from the orifices 7, into fine filaments. The glass as it exudes cools rapidly and the filaments are passed in parallel relation between the drawing rolls 37, 39 and are attenuated into very fine filaments—the rolls 46 themselves are preferably covered with a rubber-like material and they resiliently and frictionally engage the filaments to pull the glass downwardly from adjacent the orifices and attenuate it.

The speed of the drawing is variable within wide limits and may vary from a few hundred to a few thousand feet per minute; the drawing speed affects the diameter of the drawn filament and at high drawing temperatures the diameter varies approximately inversely with the speed of drawing.

The fine drawn filaments pass over a guide block 41 in substantially parallel arrangement and are subjected to a blast of hot gas from a burner 43 having a horizontal discharge slot 45. The gas blast, which suitably has a temperature of 3000° to 3500° F. and a blast velocity of 1600–2000 feet per second, melts the fine filaments and blows them forcibly, causing further attenuation of the glass to form blown fibers 47 which pass through conduit 49 to be collected in any suitable manner.

The filaments and fibers thus formed will be improved in uniformity due to the provision of the molybdenum frusto-conical body 18; it is to be noted particularly that when positioned at the glass melting level the metal body heated by the action of the induction coil not only supplies heat to the glass at the point where it is most needed—the point of entry of raw glass—but also the fire-clay material of the crucible at the surface level of the molten glass is protected from corrosive attack of the glass which attack is usually greatest at the surface level of the glass due both apparently to the tendency to foam and the partial exposure of the clay at this level to the highly heated air exiting from the combustion chamber at a temperature of about 2500° to 3000° F.; the temperature of the burning fuel gases at the lateral crucible wall usually being for filament formation about 3000° to 3500° F.

The optimum arrangement includes the positioning of the induction coils and the application of the burning fuel gases at about the glass melting level of the crucible; however other arrangements are useful and the invention is not to be considered as restricted to the preferred condition as the results desired materially influence the particular mode of operation—thus where filaments are the end product the highest degree of uniformity is desired whereas in blown fibers usually a high production rate is required even at the sacrifice of something in uniformity.

The structure of Figure 3 wherein the crucible 51 is provided with a film of metal which extends substantially completely over the inner wall is useful where the heat required to be added by induction means is somewhat greater than in Figure 1; generally it will not be necessary that the molybdenum or other metal extend over the whole base to accomplish the desired uniformity of heating, but as long as care is exercised in keeping the small orifices 7' usually about .003", free of metal, the base may be so coated and then does contribute to uniformity of temperature and sufficiency of temperature at the orifices themselves which is of considerable importance.

The crucible structure may be so arranged as in Figure 4 wherein a solid metal ring 55 having a thickness of metal of about ½ inch is positioned closely on the base of a bowl-shaped crucible 57 around the orifices 7'' in the base or it may take the form of a hollow ring 59 of such a diameter as to be retained above the orifices 7''' of the crucible 61. The ring structure provides a good mass of metal but is still of a materially smaller volume than the crucible.

In connection with Figure 5 it is to be noted that the depending portion of the base should preferably be adapted to closely engage the walls of the passage in the base of the refractory body 11; this mating assures of a firm support and inhibits any tendency for the leakage of gases from spacing 12 across the orifices as it described in my co-pending application, Serial No. 387,260, filed October 20, 1953.

It will be understood that this invention is susceptible to modification in order to adopt it to different usages and conditions and accordingly it is desired to comprehend such modifications within this invention as may fall within the scope of the appended claims.

I claim:

1. Apparatus for the production of filaments of glass comprising a body of refractory material having an opening in the bottom thereof, a crucible of a fire clay material for the retention of a pool of molten glass which pool normally has a given liquid surface level at which fresh glass fed to the pool is melted, said crucible being supported substantially within said body of refractory and having a base thereof substantially closing said opening of said refractory, said base of said crucible having a plurality of apertures for the exuding of molten glass therethrough for forming into filaments, and said body of refractory and said crucible defining a spacing around which burning gases may pass for the heating of the crucible, a thin film of a metal extending around the inner side of the crucible at about the glass melting level and terminating above the apertures of the crucible, which metal is resistant to the action of molten glass, and means to heat the said thin film of metal inductively.

2. A process for the melting of glass to a highly uniform temperature condition suitable for exuding of the glass and attenuation thereof into fine filaments comprising the steps of establishing a body of glass within a crucible of electrically non-conductive material surrounded by an induction coil and a refractory body and having a body of metal therein which metal is resistant to the action of molten glass, heating the outer walls of the crucible with burning gases interposed between said wall and said refractory body to render the glass molten, simultaneously applying an alternating current to said coil to thereby produce induction heating of the body of metal.

3. A process for the melting of glass to a highly uniform temperature condition suitable for exuding of the glass and attenuation thereof into fine filaments comprising the steps of establishing a body of glass within a crucible of electrically non-conductive material surrounded by an induction coil and a refractory body and having a body of metal at approximately the surface level of the glass which metal is resistant to the action of molten glass, heating the outer wall of the crucible with burning gases interposed between said wall and said refractory body to render the glass molten, and simultaneously apply an alternating current to said coil to thereby produce induction heating of the body of metal.

4. Apparatus for the production of filaments of glass comprising a body of refractory material having an opening in the bottom thereof, a crucible of sillimanite supported substantially within said body of refractory and having a base thereof at said opening of said refractory, the sillimanite base of said crucible having a plurality of apertures for the exuding of molten glass therethrough for forming into filaments, and said body of refractory and said crucible defining a spacing around which burning gases may pass for the heating of the crucible, a body of molybdenum supported within the crucible which is of a materially lesser volume than that of the crucible, and which body of molybdenum covers only a portion of the interior wall of the crucible, and means to heat the molybdenum within the crucible inductively.

5. In apparatus wherein glass is rendered molten for attenuation into strands, a casing of a refractory material having an opening in the base thereof, a crucible of a fire-clay material supported within said casing and having an apertured base positioned in aligned relation with said opening, a space between said casing and said crucible, means for injecting burning gases into said space to thereby heat said crucible to glass melting temperature, said crucible being adapted for the retention of molten glass and being provided with an interior surface for contacting the molten glass, a body of metal supported within the crucible above the apertured base and covering a portion only of the interior surface of the crucible, said metal being physically and chemically resistant to the action of molten glass, and means to heat the body of metal inductively.

6. In apparatus wherein glass is rendered molten for attenuation into strands, a cubical casing of a refractory material having an opening in the base thereof, an inverted frusto-conical crucible of fire-clay material supported within said casing, said crucible being adapted for the retention of molten glass and provided with an interior surface for contacting the molten glass, said crucible having a base provided with a plurality of apertures through which molten glass may be exuded as small streams to be drawn into filaments, said apertured base being positioned in aligned relation with said opening of said casing, said casing and said crucible defining a space therebetween, means for injecting burning gases into said space for heating the wall of said crucible to glass melting temperature, a body of metal supported within the crucible above the apertured base and covering a portion only of the interior wall of the crucible, said metal being physically and chemically resistant to the action of molten glass, an induction heating means including heating coils in the refractory casing in surrounding relation to the crucible and positioned at the glass level of the crucible, said heating coils being constructed and arranged to heat the body of metal inductively.

References Cited in the file of this patent

UNITED STATES PATENTS

| | | |
|---|---|---|
| 287,355 | Zellers | Oct. 23, 1883 |
| 296,227 | Schulze-Berge | Apr. 1, 1884 |
| 808,187 | Benjamin | Dec. 26, 1905 |
| 1,249,636 | Keyes | Dec. 11, 1917 |
| 1,812,172 | Rohn | June 30, 1931 |
| 1,829,352 | Heames et al. | Oct. 27, 1931 |
| 1,875,491 | Pollak | Sept. 6, 1932 |
| 1,937,065 | Moore | Nov. 28, 1933 |
| 1,944,855 | Wadman | Jan. 23, 1934 |
| 2,031,083 | Weller | Feb. 18, 1936 |
| 2,186,718 | Ferguson | Jan. 9, 1940 |
| 2,244,777 | Hood | June 10, 1941 |
| 2,286,903 | Dockerty | June 16, 1942 |
| 2,294,266 | Barnard | Aug. 25, 1942 |
| 2,578,100 | Stalego | Dec. 11, 1951 |
| 2,635,125 | Upton | Apr. 14, 1953 |

FOREIGN PATENTS

| | | |
|---|---|---|
| 478,334 | Great Britain | 1938 |
| 590,597 | Germany | Jan. 5, 1934 |
| 976,554 | France | Nov. 1, 1950 |